US008416268B2

(12) United States Patent
Tomisawa et al.

(10) Patent No.: US 8,416,268 B2
(45) Date of Patent: Apr. 9, 2013

(54) IMAGE DISPLAY DEVICE

(75) Inventors: Isao Tomisawa, Fuchu (JP); Masaru Ishikawa, Kiyose (JP); Takehiro Takahashi, Yokohama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/681,186

(22) PCT Filed: Oct. 1, 2007

(86) PCT No.: PCT/JP2007/069170
§ 371 (c)(1),
(2), (4) Date: May 18, 2010

(87) PCT Pub. No.: WO2009/044437
PCT Pub. Date: Apr. 9, 2009

(65) Prior Publication Data
US 2010/0245345 A1    Sep. 30, 2010

(51) Int. Cl.
*G06T 15/00* (2006.01)
(52) U.S. Cl.
USPC .............................. 345/679; 345/681; 345/1.2
(58) Field of Classification Search .................... 345/419
See application file for complete search history.

(56) References Cited

U.S. PATENT DOCUMENTS

| 6,232,932 | B1 * | 5/2001 | Thorner | 345/1.3 |
| 6,972,738 | B2 | 12/2005 | Ishikawa | |
| 7,956,819 | B2 * | 6/2011 | Tomisawa et al. | 345/1.1 |
| 2004/0135741 | A1 | 7/2004 | Tomisawa et al. | |
| 2005/0185276 | A1 | 8/2005 | Tomisawa et al. | |

FOREIGN PATENT DOCUMENTS

| JP | 2003-098479 | 4/2003 |
| WO | WO 2006/035816 | 4/2006 |
| WO | WO 2007/013215 | 2/2007 |
| WO | WO 2007/097225 | 8/2007 |

OTHER PUBLICATIONS

Benko, et al ("Cross-Dimensional Gestural Interaction Techniques for Hybrid Immersive Environments", IEEE Virtual Reality, Mar. 12-15, 2005, Bonn, Germany).*
Benko, et al ("Collaborative Mixed Reality Visualization of an Archaeological Excavation", Proceedings Intl Symposium on Mixed and Augmented Reality (ISMAR'04), IEEE 2004, pp. 1-9).*
Gerfelder, et al ("Challenges to Deliver 2D/3D Content for Multimedia Applications in Mobile Environments", ACTS Mobile Communications Summit 98, Rhodos, Greece, Jun. 8-11, 1998).*
International Search Report for PCT/JP2007/069170, mailed Jan. 8, 2008.

* cited by examiner

*Primary Examiner* — Ulka Chauhan
*Assistant Examiner* — Patrick F Valdez
(74) *Attorney, Agent, or Firm* — Nixon & Vanderhye P.C.

(57) ABSTRACT

In an image display device, an image controller controls a floating image and a direct view image so as to be linked to each other. The image controller displays a given object as the floating image, and displays the floating image such that the given object displayed as the floating image is shifted in a specified first direction from a displayed position of the floating image to a second image screen. The image controller executes a process associated with the given object during or after the shift of the given object, and displays, on the second image screen, a two-dimensional image on which the executed process is reflected.

7 Claims, 15 Drawing Sheets

FIG.2
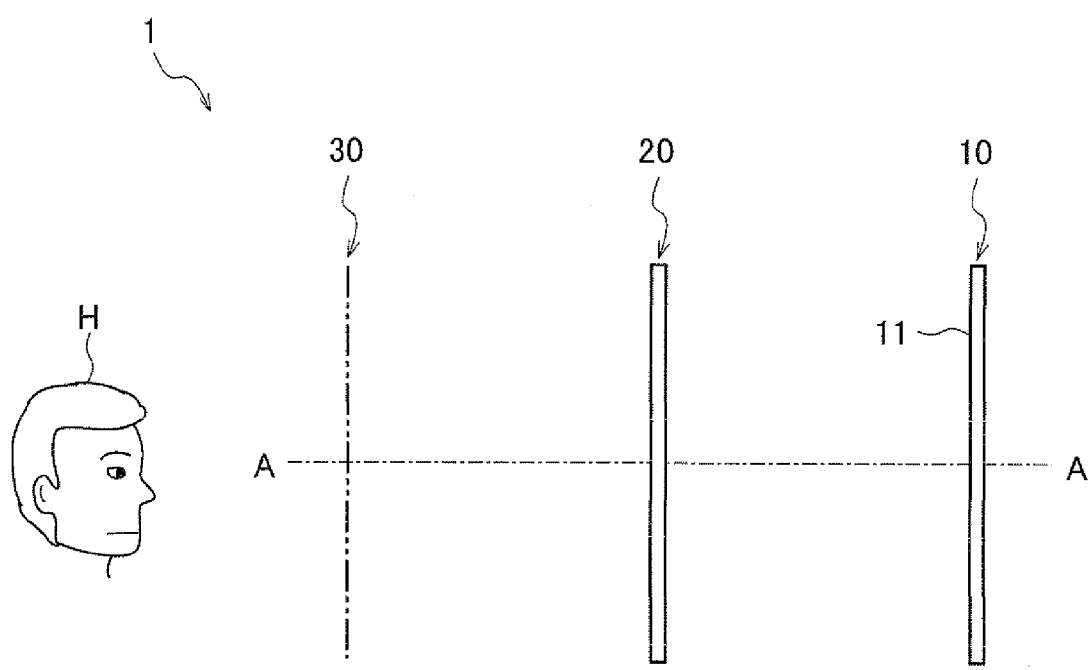
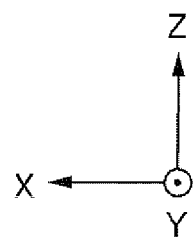

FIG.5
(a)
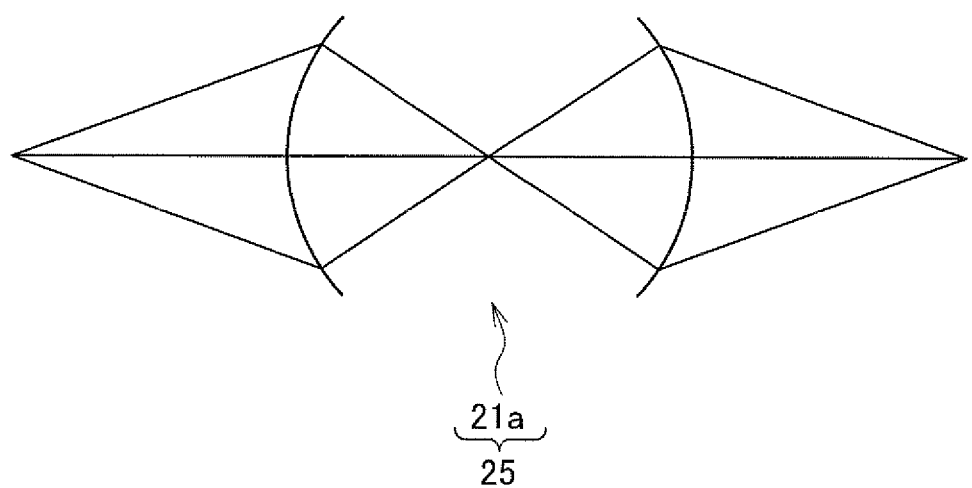
(b)
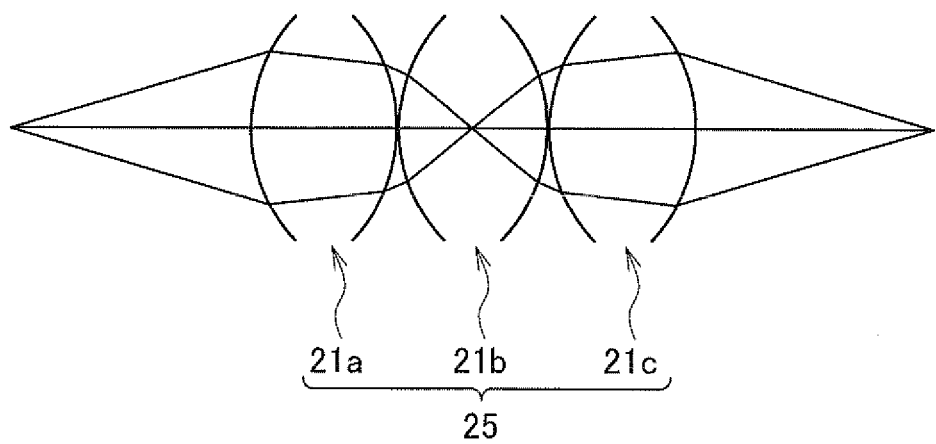

FIG.7
(a)
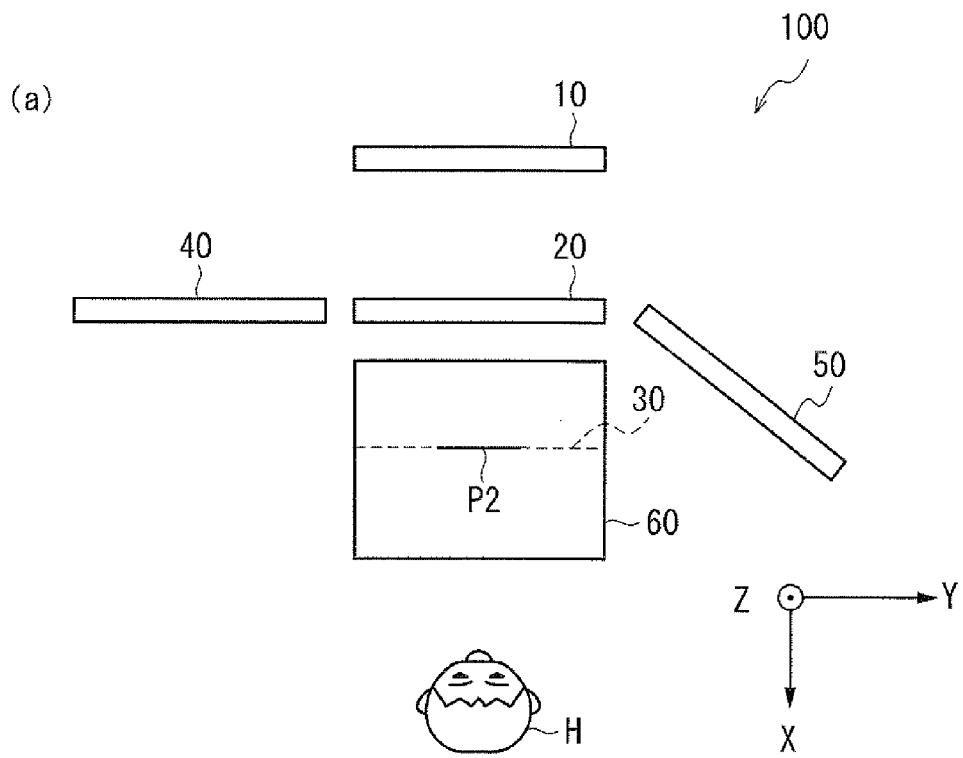
(b)
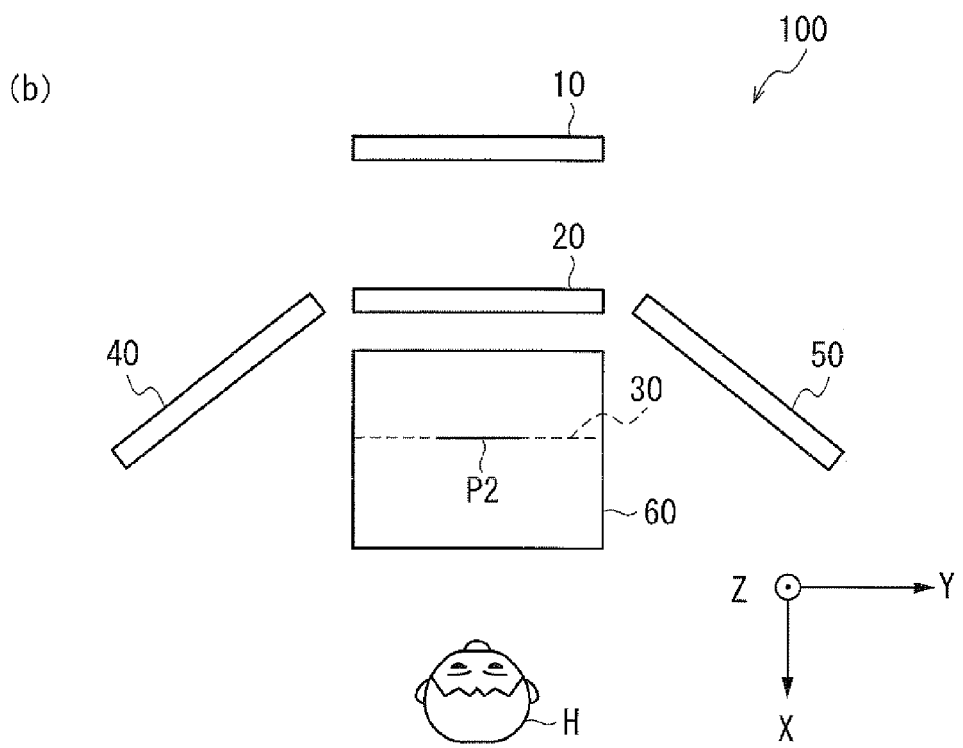

FIG.10
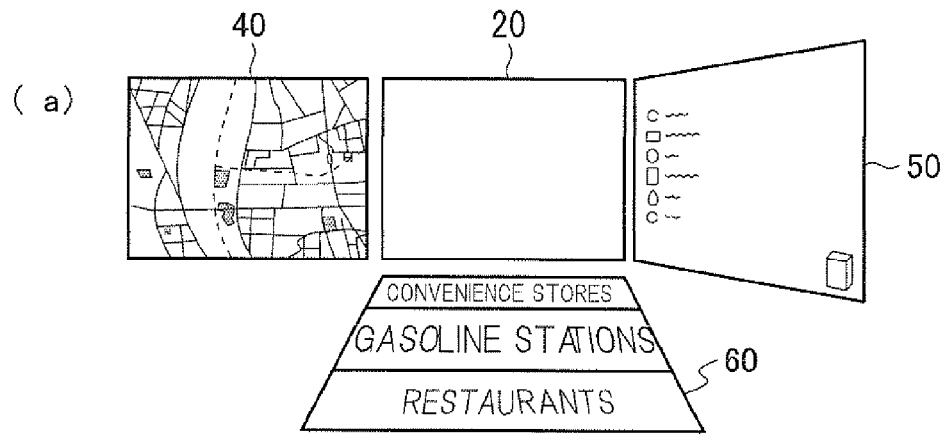
(a)
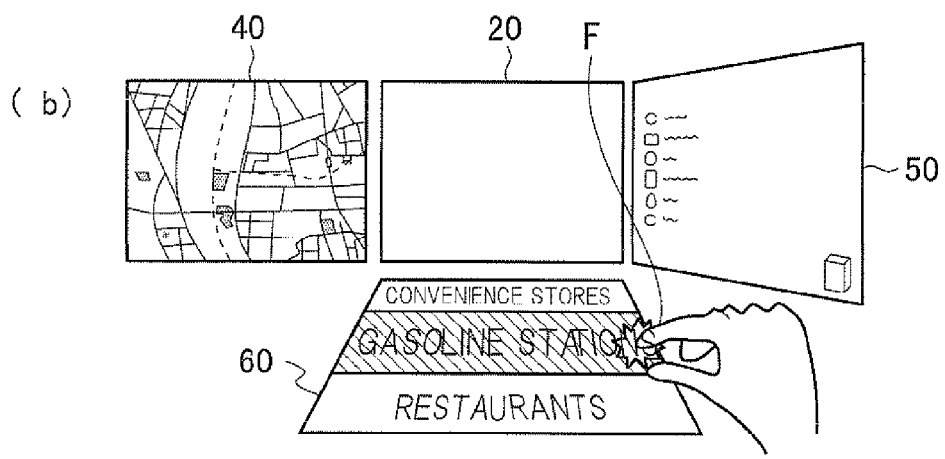
(b)
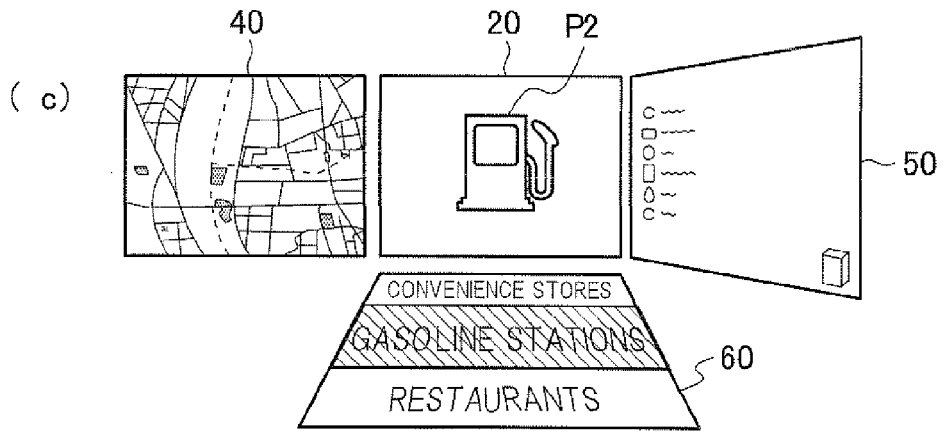
(c)

FIG.11
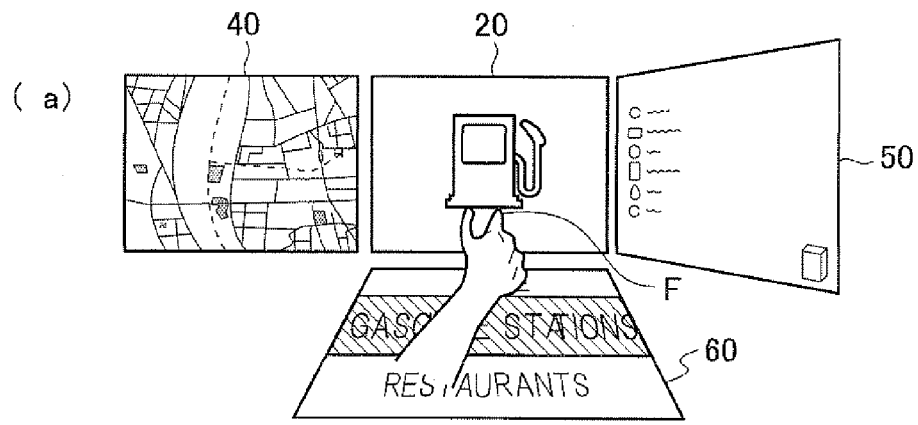
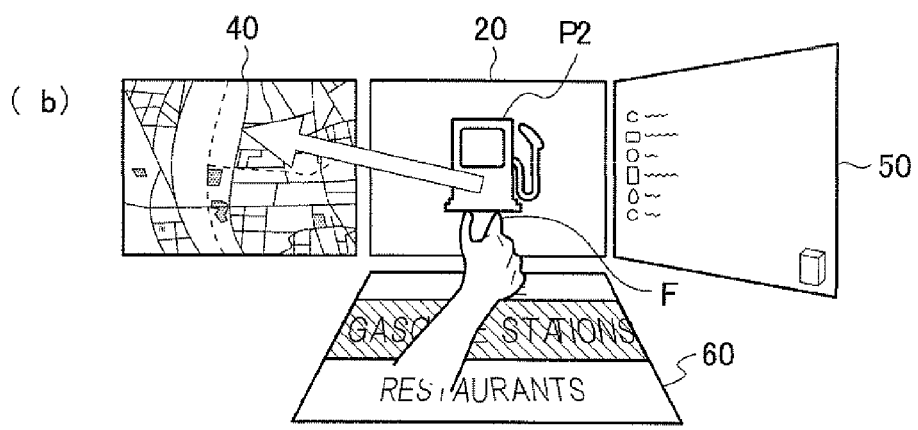
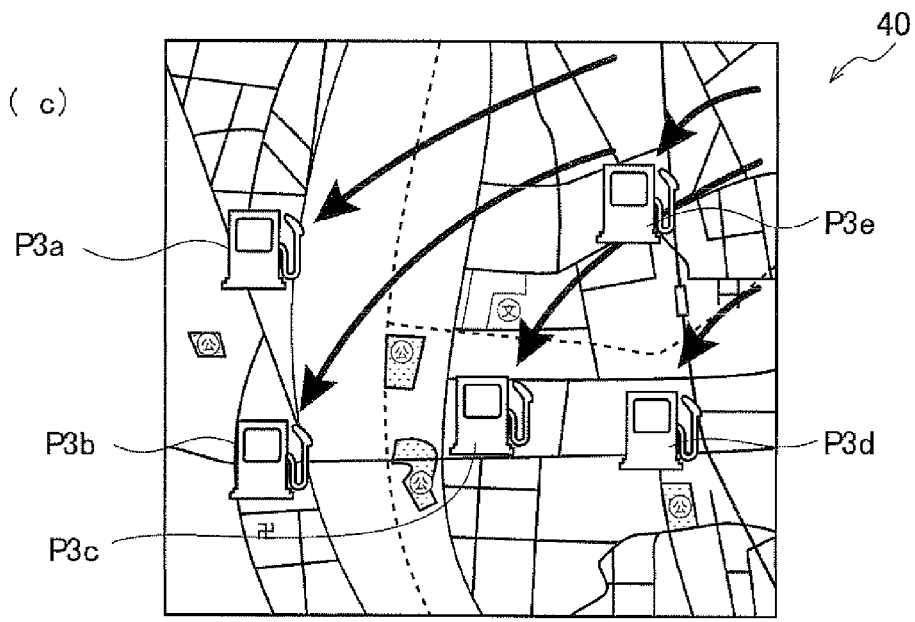

FIG.12
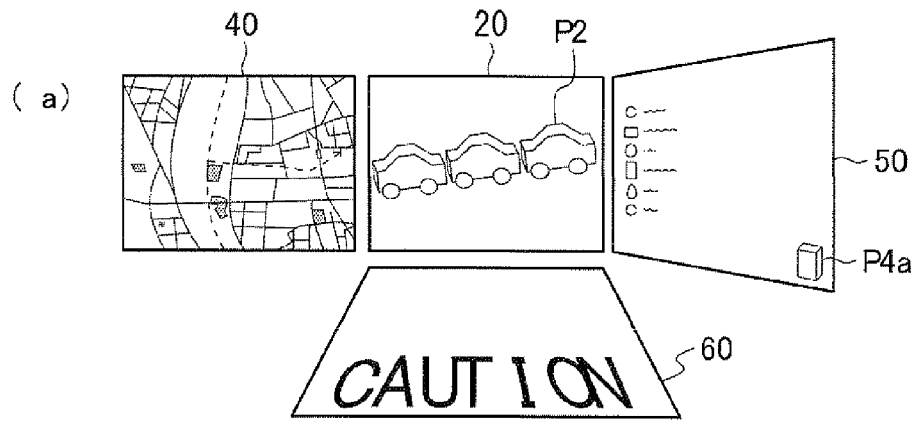
(a)
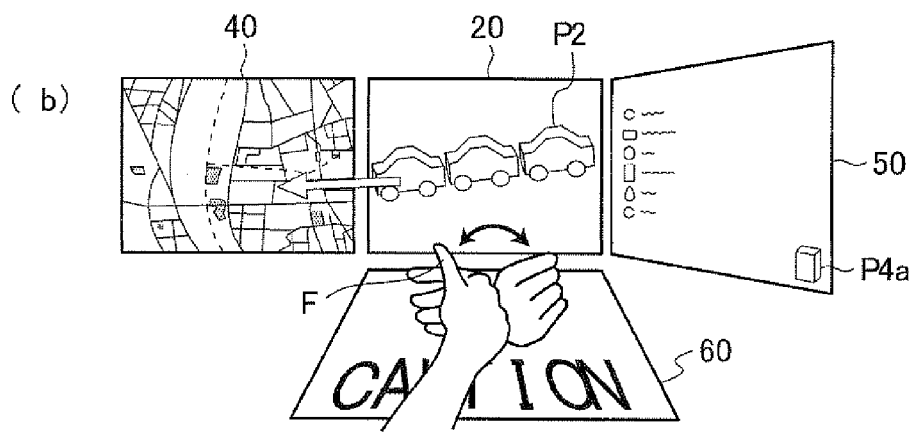
(b)
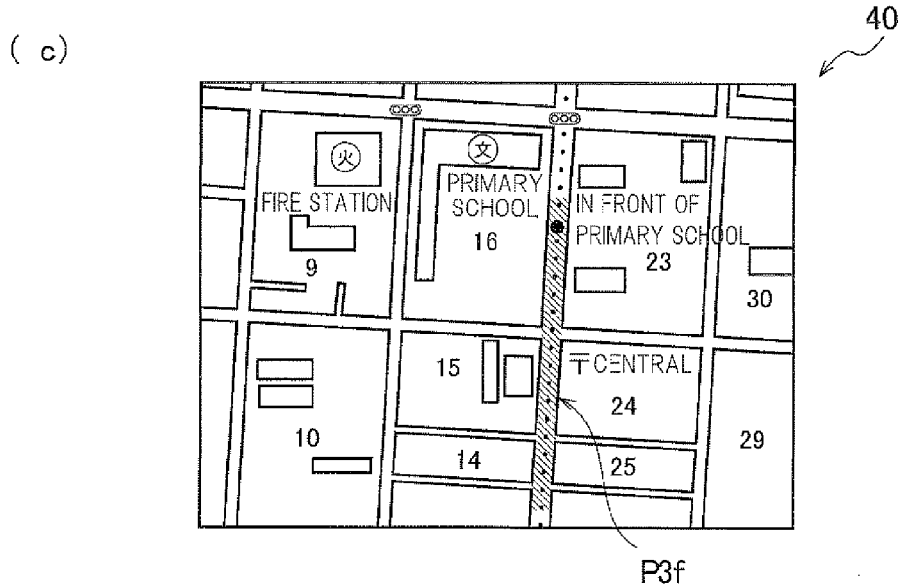
(c)

FIG.13
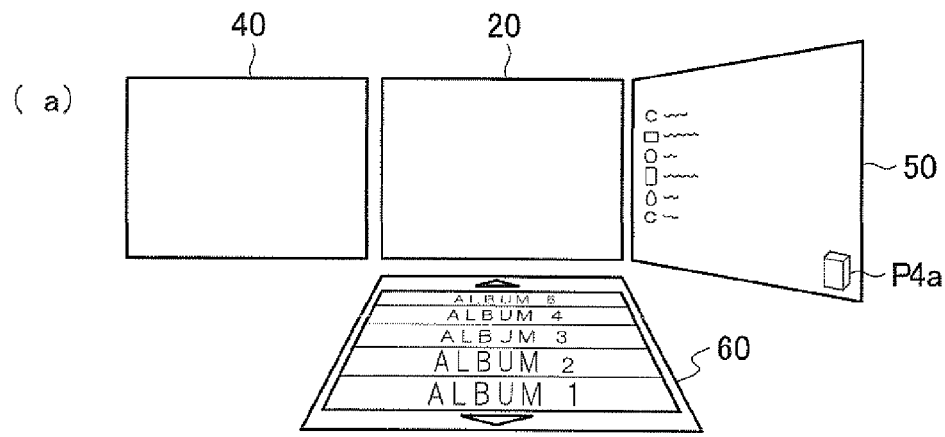
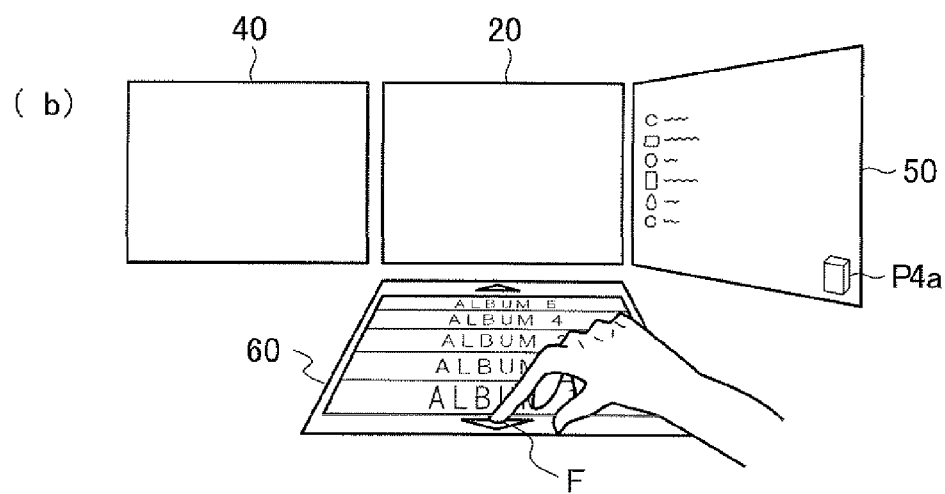
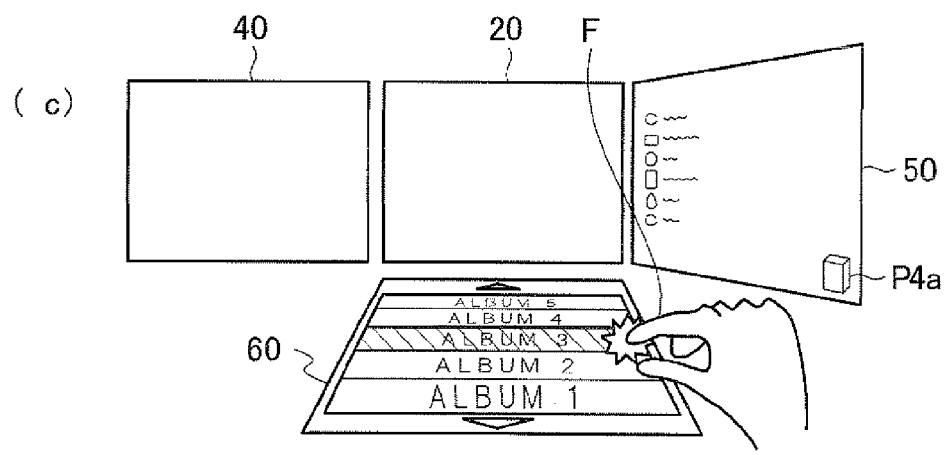

IMAGE DISPLAY DEVICE

This application is the U.S. National Phase of International Application No. PCT/JP2007/069170, filed 1 Oct. 2007, which designated the U.S. the entire contents of which is hereby incorporated by reference.

TECHNICAL FIELD OF THE INVENTION

The present invention relates to image display devices for pseudo-stereoscopically displaying two-dimensional images.

BACKGROUND ART

Recently, various systems for providing viewers stereoscopic images are proposed.

In these types of image display devices, there are common systems that use binocular parallax to thereby provide, as three-dimensional images, two-dimensional images on an image screen of a display or the like.

However, in these systems using the binocular parallax, because a viewer watches a pseudo image as a three-dimensional image of a target object, the focus on the image screen and the convergence are off from each other, the viewer may be subjected to physiological effect.

Thus, as another system, an image display device, in which an image transfer panel (for example, a microlens array consisting of a plurality of lenses) is placed in front of a two-dimensional image at a predetermined space therefrom, for displaying a pseudo stereoscopic image (floating image) of the two-dimensional image onto a space in front of the image transfer panel has been known (for example, see a first patent document and a second patent document).

The image display device is adapted to focus the two-dimensional image by the image transfer panel while floating the two-dimensional image, thus displaying the two-dimensional image as if to display a three-dimensional image.

In such image display devices, there are image display devices that have two image screens for a two-dimensional image. An image to be displayed on one of the two image screens is recognized as a pseudo-stereoscopic image of the two-dimensional image, and an image to be displayed on the other thereof is recognized as a direct view image (see, for example, a third patent document).

First patent document: 2001-255493
Second patent document: 2003-098479
Third patent document 2005-234240

DISCLOSURE OF THE INVENTION

Problems to be Solved by the Invention

Because an image display device having the two image screens can carry out a display of integrated direct view and floating images, thus making it possible to improve stereoscopic visual effects.

However, in image display that links direct images and floating images, a more increase in the stereoscopic visual effect can provide users more realistic images; this can more improve dramatic impact.

In addition, if a movement of direct images with floating images provides a nonconventional display interface, direct and easy-to-understand display of information can be carried out for users.

The present invention has been made to solve the aforementioned circumstances, and has an example of a purpose of providing image display devices that improve the linking between direct images and floating images to more enhance dramatic impact, and that can carry out direct and easy-to-understand display of information for users.

Means for Solving the Problems

In order to achieve such a purpose provided above, an image display device according to one aspect of the present invention is provided. The image display unit according to the one aspect of the present invention includes a first display unit having a first image screen for displaying a two-dimensional image, an image transfer panel located on a path of light left from the first image screen, a floating image display means that displays, as a floating image, the light left from the first image screen in a space, the space being located on one side of the image transfer panel opposite to the other side thereof facing the first display unit, a direct-view image display means provided with a second display unit having a second image screen for displaying a two-dimensional image, the direct-view image display means displaying the two-dimensional image displayed on the second image screen as a direct view image, and an image controller that controls the floating image and the direct view image so as to be linked to each other. The image controller includes a floating-image control means that displays a given object as the floating image, and displays the floating image such that the given object displayed as the floating image is shifted in a specified first direction from a displayed position of the floating image to the second image screen, and a direct-view image control means that executes a process associated with the given object during or after the shift of the given object, and displays, on the second image screen, a two-dimensional image on which the executed process is reflected.

BRIEF DESCRIPTION OF THE DRAWINGS

FIG. 2 is an outline view of the floating image display unit of the image display device according to the embodiment of the present invention as viewed from its lateral direction;

FIG. 5 is a view describing optical operations of a microlens array having a structure different from that of the microlens array illustrated in FIG. 4;

FIG. 7 is a plan view of the image display device according to each of the embodiment of the present invention and its modification;

FIG. 10 is a view illustrating, in cooperation with FIG. 11, examples of images in a first representation embodiment of the linking representations by the image display device according to the embodiment of the present invention;

FIG. 11 is a view illustrating, in cooperation with FIG. 10, the examples of the images in the first representation embodiment of the linking representations by the image display device according to the embodiment of the present invention;

FIG. 12 is a view illustrating examples of images in a second representation embodiment of the linking representations by the image display device according to the embodiment of the present invention;

FIG. 13 is a view illustrating, in cooperation with FIG. 14, examples of images in a third representation embodiment of the linking representations by the image display device according to the embodiment of the present invention;

DESCRIPTION OF CHARACTERS

Figure 1:
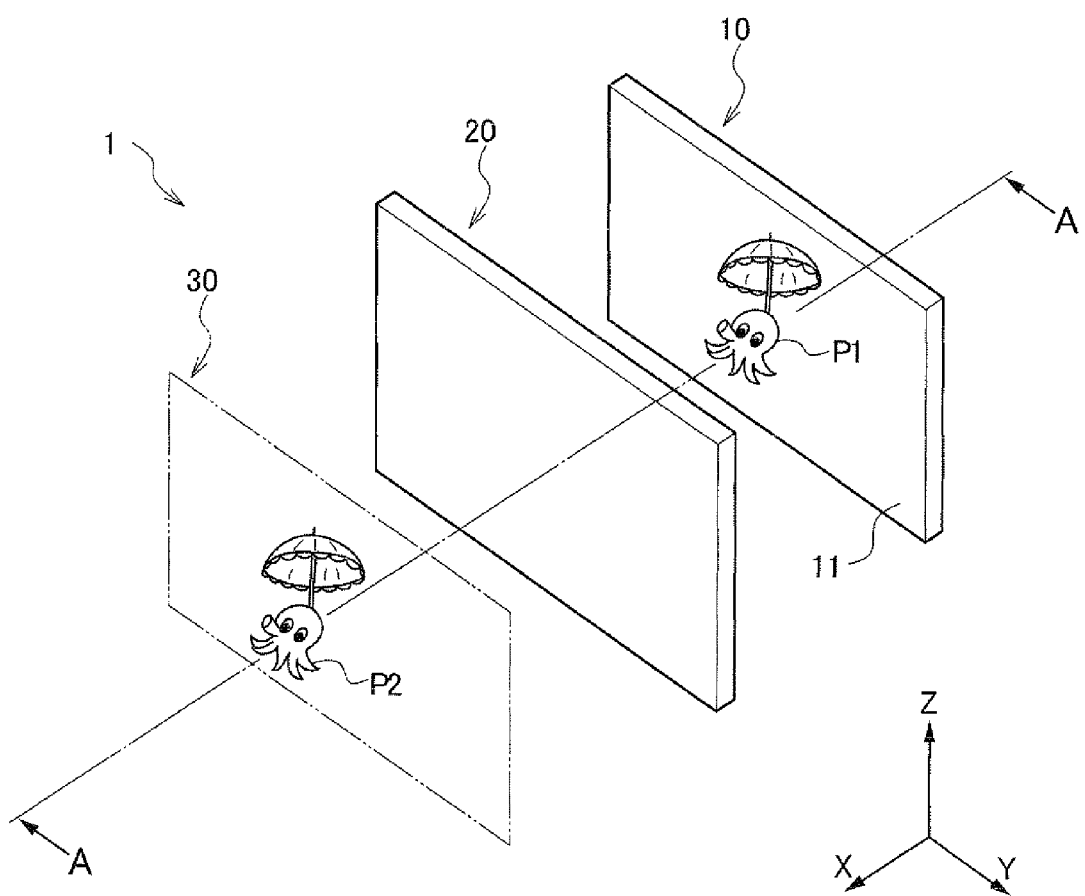
FIG. 1 is an outline perspective view of a floating image display unit of an image display device according to an embodiment of the present invention.

1 Floating image display unit
2 Direct-view image display unit
10, 40, 50, 60 Display unit
11, 41, 51, 61 Image screen
20, 20A Image transfer panel
21 Lens array half
22 Transparent substrate
23 Micro convex lens
25 Microlens array
30 Image plane
100, 100A Image display device
101 Housing
P1 Two-dimensional image
P2, P2A Floating image
P3, P4, P5 Direct view image
H Viewer
F Detected object

BEST MODES FOR CARRYING OUT THE INVENTION

An embodiment of the present invention will be described hereinafter with reference to the drawings.

An image display device 100 according to the embodiment is a pseudo stereoscopic-image display device for displaying, on a preset plane in a space, a two-dimensional image that is visibly recognizable by a viewer H as a stereoscopic image. The image display device 100 is roughly provided with a floating image display unit 1 having a function of displaying a floating image, and a direct-view image display unit 2. Note that floating images mean real images displayed on a preset plane in a space so that the viewer H can look them as if they float in the space. Direct view images mean two-dimensional images that the viewer H directly views on an image screen.

Before describing the image display device 100, the structure of the floating image display unit 1 as the core of the image display device 100 will be described.

<Structure of the Floating Image Display Unit>

FIGS. 1 and 2 are schematically structural views of an image display device 100 according to the embodiment of the present invention. FIG. 1 is an outline perspective view of the image display device 100, and FIG. 2 is an outline view of the image display device 100 as viewed from its lateral direction (A-A direction of FIG. 1).

The floating image display unit 1 is made up of a display unit 10, and an image transfer panel 20 located to be spaced from the display unit 10.

The display unit 10 is equipped with an image screen 11 for displaying two-dimensional images, and with a display driver (not shown) for drive and control of the display unit 10.

Specifically, as the display unit 10, a color liquid crystal display (LCD) can be used, which is provided with a flat screen 11 and a display driver consisting of an illuminating backlighting unit and a color liquid crystal drive circuit. Note that another device except for the LCD, such as an EL (Electra-Luminescence) display, a plasma display, CRT (Cathode Ray Tube), or the like, can be used.

Figure 3:
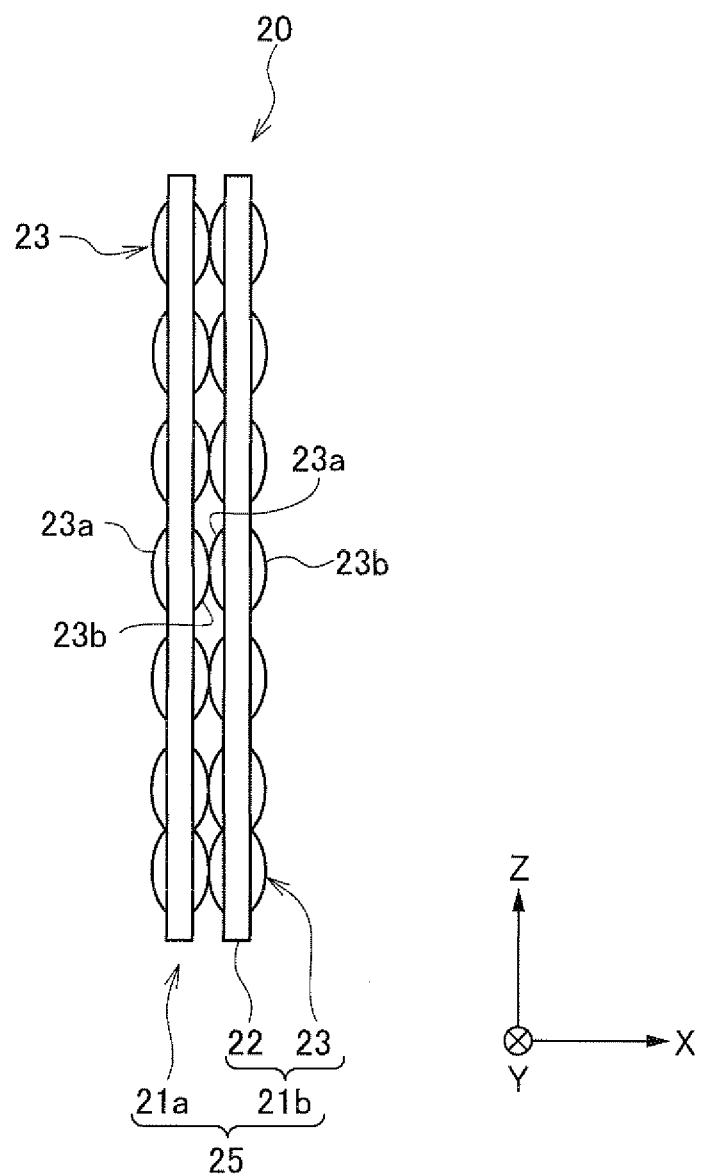
FIG. 3 is a structural view of an image transfer panel of the image display device according to the embodiment of the present invention.

The image transfer panel 20 includes, for example, a microlens array 25 with a panel screen arranged in substantially parallel to the image screen 11 of the display unit 10. The microlens array 25, as illustrated in FIG. 3, is configured such that two lens array halves 21a, 21b are arranged in parallel to each other. Each of the lens array halves 21a, 21b is designed such that a plurality of micro convex lenses 23 are two-dimensionally arranged to be adjacent to each other on either surface of a transparent substrate 22 made from high translucent glass or resin; the micro convex lenses 23 have the same radius of curvature.

An optical axis of each of the micro convex lenses 23a formed on one surface is adjusted such that the adjusted optical axis is aligned with the optical axis of a corresponding micro convex lens 23b formed at an opposing position on the other surface. Specifically, individual pairs of the micro convex lenses 23a, 23b adjusted to have the same optical axis are two-dimensionally arranged such that their respective optical axes are parallel to each other.

The microlens array 25 is placed in parallel to the image screen 11 of the display unit 10 at a position far therefrom by a predetermined distance (a working distance of the microlens array 25). The microlens array 25 is adapted to focus light, corresponding to an image and left from the image screen 11 of the display unit 10, on an image plane 30 on the side opposite to the image screen 11 and far therefrom at the predetermined distance (working distance of the microlens array 25). This displays the image displayed on the image screen 11 on the image plane 30 as a two-dimensional plane in a space.

The formed image is a two-dimensional image, but is displayed to float in the space when the image has depth or the background image on the display is black with its contrast being enhanced. For this reason, the viewer H looks the formed image as if it is floated. Note that the image plane 30 is a virtually set plane in the space and not a real object, and is one plane defined in the space according to the working distance of the microlens array 25.

Note that an effective area (specifically, an arrangement area of micro convex lenses that can effectively form entered light onto the image plane 30) and the arrangement pitches of micro convex lens arrays of the microlens array are floating-image display parameters of the microlens array 21 side. The pixel pitches, an effective pixel area, and brightness, contrast, and colors of images to be displayed on the image screen 11a of the display 11 are floating-image display parameters of the display 11 side. The floating-image display parameters and the floating-image display parameters are optimized so that floating images to be displayed on the image plane 30 are sharply displayed.

Figure 4:
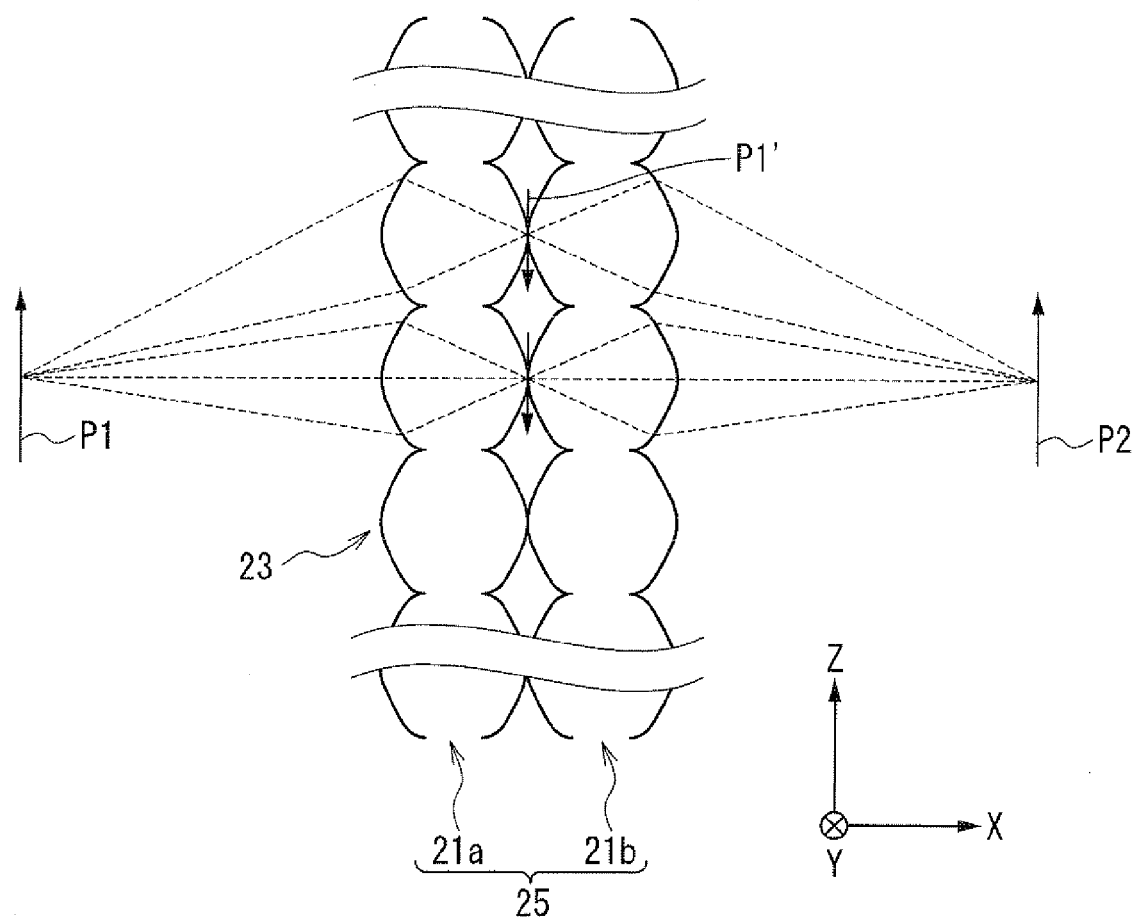
FIG. 4 is a view describing optical operations of a microlens array that is the image display device according to the embodiment of the present invention.

This results in that the microlens array 25, as illustrated in FIG. 4, is adjusted to be arranged such that:

light corresponding to an image P1 and left from the image screen 11 of the display unit 10 is incident from the lens array half 21a, flipped thereinside at one time, flipped again, and thereafter, outputted from the lens array half 25b.

This allows the microlens array 25 to display the two-dimensional image P1 displayed on the image screen 11 of the display unit 10 as an erected floating image P2 on the image plane 30.

More specifically, in the light forming the two-dimensional image P1 to be displayed on an image screen 11a, light of an image in a region corresponding to each of the micro convex lenses 23 of the microlens array 25 is captured by each of the micro convex lenses 23, flipped in each of the micro convex lenses 23, flipped again, and outputted so that the floating image P2 is displayed as a set of erected images formed by the respective micro convex lenses 23.

Note that the microlens array 25 is not limited to the structure of a pair of two lens array halves 21a, 21b, and can be configured by a single lens array, or by a plurality of lens arrays equal to or greater than three lens arrays. Of course, when a floating image is formed by odd-numbered, such as one or three, lens array halves 21, referring to (a) and (b) of FIG. 5, light incident to the micro lens array 25 is flipped at one time therein, and flipped again. For this reason, it is possible to display an erected floating image.

As described above, various configurations of the microlens array 25 can be made. These configurations allow the working distance for forming light to have a constant effective range without limiting the single working distance.

Note that, in the embodiment, the image transfer panel 20 is the microlens array 25, but not limited thereto, and can be any member for forming erected images, desirably erected equal-magnification images. Other forms of lenses, or imaging mirrors or imaging prisms except for lenses can be used.

For example, a gradient index lens array, a GRIN lens array, a rod lens array, or the like can be a microlens array, and a roof mirror array, a corner mirror array, a dove prism or the like can be a micromirror array. One Fresnel lens having a required active area, which forms a reverted image, can be used in place of arrays.

<Structure of the Image Display Device>

Figure 6:
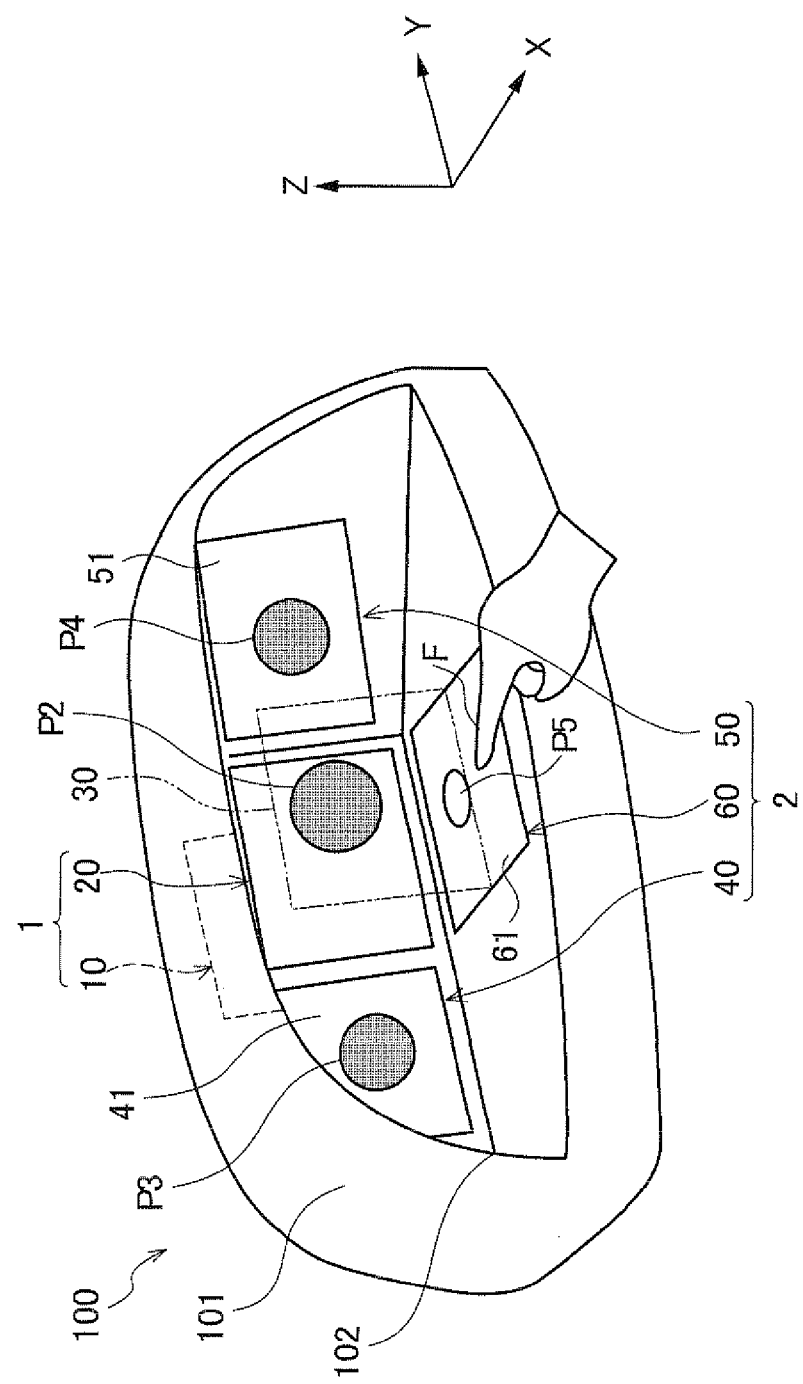
FIG. 6 is an outline perspective view of the image display device according to the embodiment of the present invention.
Figure 8:
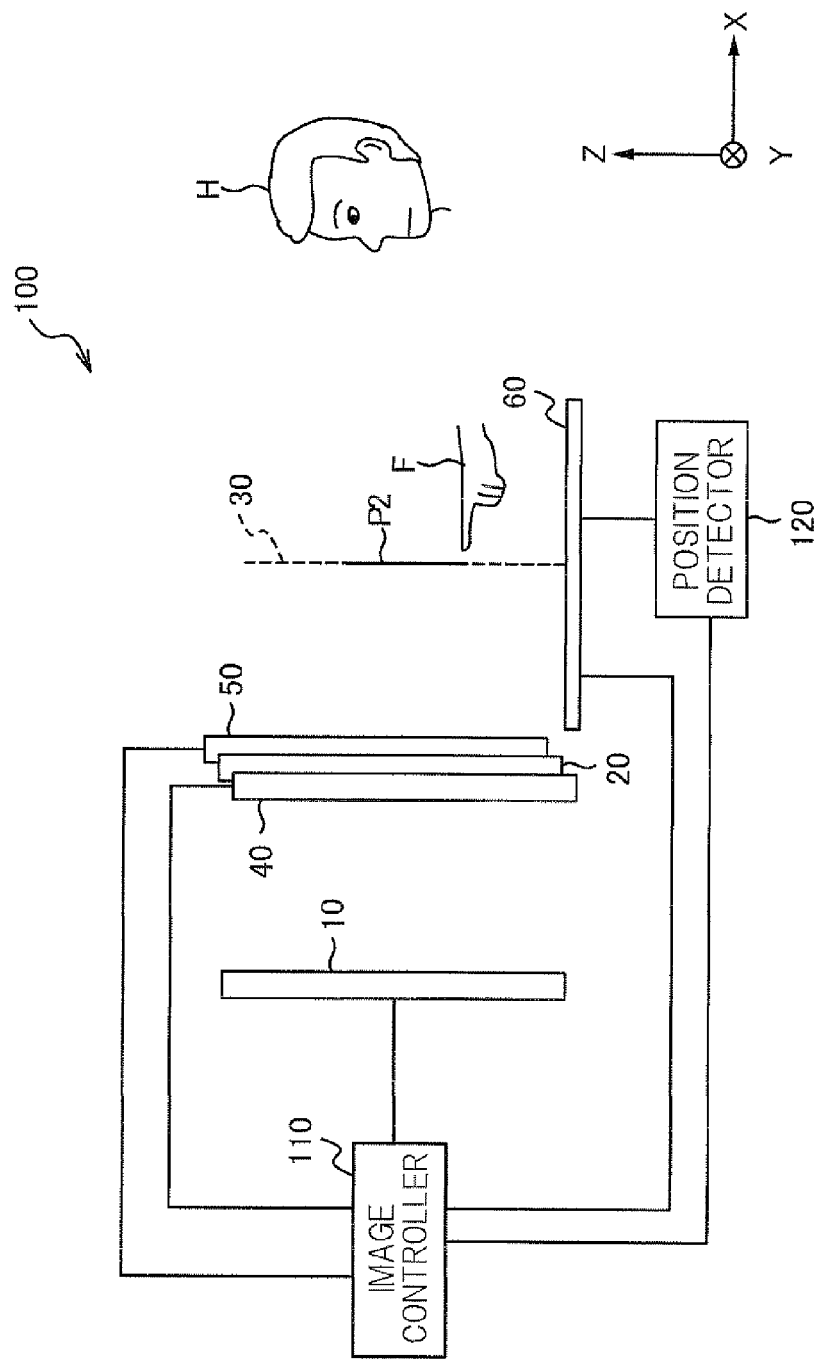
FIG. 8 is an operational structural view of the image display device according to the embodiment of the present invention.

FIG. 6, (a) of FIG. 7, and FIG. 8 are schematic structural views of the image display device 100. FIG. 6 is an outline perspective view of the image display device 100, (a) of FIG. 7 is a plan view of the image display device 100 as viewed from above thereof, and FIG. 8 is an operational structural view of the image display device 100 as a base of a left side view thereof. Note that, in (a) of FIG. 7 and FIG. 8, fundamental structural elements are only illustrated and a housing of the image display device 100 is omitted in illustration.

The image display device 100 includes the floating image display unit 1, the direct-view image display unit 2, and a housing 101 that has an opening at its front surface facing the viewer H and that integrates each portion with each other. Note that the image display device 100 includes a speaker (not shown), and can output sound in addition to outputting images.

As described above, the floating image display unit 1 is made up of the display unit 10 and the image transfer panel 20, and displays a floating image P2 on the image plane 30. In the embodiment, because the display unit 10 and the image transfer panel 20 are located at the center of the housing 101, the viewer H recognizes the floating image P2 at substantially the center of the housing 101. Note that, in the embodiment, the image plane 30 will also be referred to as floating-image plane.

In the embodiment, the direct-view image display unit 2 includes three display units around the image plane 30 on which the floating image P2 is to be displayed. Specifically, the direct-view image display unit 2 includes a display unit 40 disposed at the left (−Y direction) of the image transfer panel 20, a display unit 50 disposed at the right (+Y direction), and a display 60 disposed at the front (+X direction) side of and below (−Z direction) the image transfer panel 20. As the display units 40, 50, and 60, color liquid crystal displays (LCD) can be used as well as the display unit 10, each of which is provided with a flat screen and a display driver consisting of an illuminating backlighting unit and a color liquid crystal drive circuit.

The viewer H can directly view a two-dimensional image P3 (direct view image P3) displayed by the display unit 40, a two-dimensional image P4 (direct view image P4) displayed by the display unit 50, and a two-dimensional image P5 (direct view image P5) displayed by the display unit 60. Specifically, the viewer H can visibly recognize four images, and each of the direct view images P3, P4, and P5 to be displayed by the direct image display unit 2 has an advantage of enhancing a stereoscopic effect of the floating image P2. Note that, in the embodiment, the image screen 41 of the display unit 40, the image screen 51 of the display unit 50, and the image screen 61 of the display unit 60 will be referred to as "direct-view image planes".

In the embodiment, as illustrated in FIG. 6 and (a) of FIG. 7, the image screen 41 of the display unit 40 and the panel surface of the image transfer panel 20 are opposite to the viewer H and each placed in the depth direction (−X direction) far therefrom by a same distance. In contrast, the image screen 61 of the display unit 60 is placed obliquely with respect to the panel surface of the image transfer panel 20. Specifically, the display unit 60 outputs the direct view image P4 displayed on the image screen 61 toward substantially its center when the left of the image screen 61 is set as the back and the right is set as the front.

In addition, in the embodiment, the image plane 30 is formed above the image screen 61 to be substantially orthogonal to the image screen 61. This allows the direct view image P5 to be set as the shade of the floating image P2 or the reflection thereof, which can more enhance the stereoscopic effect of the floating image P2.

Moreover, in the embodiment, the image plane 30 is placed at the front (in the +X direction) of the image screen 41 of the display unit 40. Specifically, the image screen 41 for direct images and the image plane 30 for floating images are arranged away from each other in the depth direction (X direction). For this reason, in the embodiment, it is possible to more highlight the floating image P2 displayed at the front, and emphasize the perspective sensation of the floating image P2. In addition, the image display device 100, described later, has a function of detecting an object F to be detected, such as a finger, of the viewer H in a space close to the image plane 30. In the embodiment, because the image screen 41 is placed at the back side of the image plane 30, an open space is formed in which the detected object F is easily movable.

Note that, the arrangement of the direct image display unit 2 is not limited to this, and another arrangement of the direct image display unit 2 can be used. For example, both the display unit 40 and the display unit 50 can be flush with the panel plane of the image transfer panel 20. In addition, as illustrated in (b) of FIG. 7, the display unit 40 and the display unit 50 are so symmetrically arranged in right and left directions (the Y direction) as to flare in a substantially tapered shape in the −X direction. The number of the display units that constitute the direct image display unit 50 is not limited to this. For example, a single display unit or two display units can constitute the direct image display unit 2.

Next, image control of the image display device 100 according to the embodiment will be described with reference to FIG. 8. The image display device 100 is provided with an image controller 110 and a position detector 120 as a control mechanism.

The position detector 120 is a sensor that detects the position and motion of the detected object, such as a finger, F of the viewer H, and is adapted to output, to the image controller 110, a detected signal. Specifically, the position detector 120 is made up of a touch sensor and a space sensor. The touch sensor is placed on the image screen 61 of the display unit 60, and detects the contact position of the detected object F with respect to the image screen 61. The space sensor detects the position and motion of the detected object F in a space close to the image plane 30.

Specifically, the image screen 61 of the display unit 60 serves as a touch-panel area, and the space close to the image plane 30 serves as a sensing area of the space-sensor. Note that any type of sensors can be used as each of the touch sensor and the space sensor. For example, a capacitive touch sensor or a resistive touch sensor and an optical space sensor can be used. In addition, in the embodiment, such two sensors are placed to detect the position of the detected object F, but the configuration of the sensors is not limited thereto. Any of sensors, which detects the position of the detected object F in the space close to the image plane 30 and the image screen 61 of the display unit 60, can be used.

The image controller 110 is adapted to image data to be displayed on each of the display units 10, 40, 50, and 60. The display driver of each display unit displays, on the image screen, an image corresponding to the image date generated by the image controller 110. The image controller 110 controls the image P1 to be displayed on the display unit 10 and the direct view images P3, P4, and P5 to be displayed on the respective display units 40, 50, and 60 such that the images P1, P3, P4, and P5 are changed according to signals outputted from the position detector 120.

Specifically, the image controller 110 is adapted to change the floating image P2 and the direct view images P3, P4, and P5 according to the position and/or motion of the detected object F of the viewer H.

Figure 9:
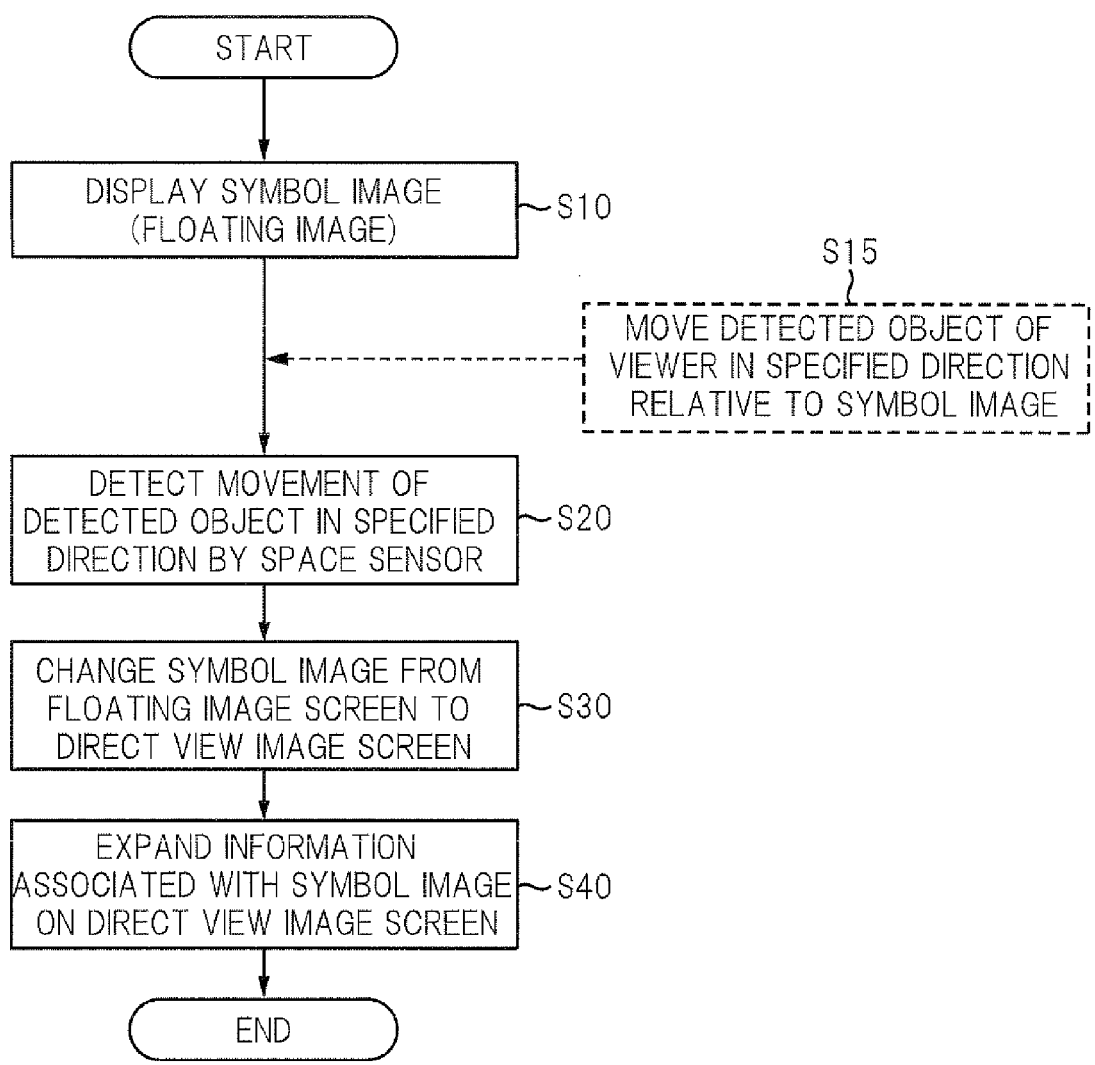
FIG. 9 is a flowchart illustrating operations of the image display device according to the embodiment of the present invention for linking representations.

Next, visual representations that link a floating image and a direct view image of the image display device 100 according to the embodiment will be described with reference to FIG. 9. The visual representations will be referred to as "linking representations" hereinafter. FIG. 9 is a flowchart illustrating operations of the image display device 100 for the linking representations. Here, solid portions represent the operations of the image display device 100, and dashed portions represent the motion of the viewer H.

First, the image controller 110 of the image display device 100 displays the floating image P2 on the image plane 30 (step S10). The floating image P2 is a symbol image (an image that allows contents of processes and functions to be intuitively recognized). When viewing the symbol image as the floating image P2, the viewer H can understand the contents of the processes that the symbol image means. In addition, the symbol image also serves as an item (operation object) as an operation target operable by the viewer H. For this reason, the symbol image displayed as the floating image P2 will be referred to as "3D icon".

When the 3D icon as the floating image P2 is displayed, the viewer H moves the detected object, such as a finger, F close to the 3D icon in a specific direction in order to operate the 3D icon (step S15). In this case, the detected object F can or cannot be touched to the 3D icon. Note that the linking representations assume that the operation of moving the detected object F in a specific direction means execution (or non-execution) of the 3D icon.

Specifically, the movement of the viewer's detected object F to the left allows execution of a function of the displayed 3D icon, and the movement of the viewer's detected object F to the right allows non-execution of a function of the displayed 3D icon. As described above, in the embodiment, the direction of the movement of the detected object F gives different instructions to the 3D icon. In the flowchart, the following operations will be described when execution of the function of the 3D icon is instructed by the detected object F.

When detecting the movement of the detected object F in a specified direction (step S20), the image controller 110 executes the function assigned to the 3D icon. First, the image controller 110 changes the image of the 3D icon (step S30). Specifically, the image controller 110 controls the two-dimensional image P1 of the display device 10 so that the 3D icon displayed on the image plane 30 is shifted from the image plane 30 to the image screen 41 of the display unit 40 (step S30).

In the embodiment, the image screen 41 of the display unit 40 is placed at the left (−Y direction) and the back (−X direction) of the image plane 30. For this reason, specifically, the 3D icon displayed at substantially the center of the image plane 30 is controlled to be shifted to the left while its size is gradually reduced to be finally lost.

This image control allows the viewer H to view a visual effect that the 3D icon is shifted from the image plane 30 to the image screen 41, and falls into the image screen 41 of the display unit 40.

In the embodiment, as described in the structure of the image display device 100, the image screen 41 is disposed at the left of the image plane 30 for the floating image P2 and at the back thereof. For this reason, the operation of the movement of the detected object F in the left direction is similar to the operation of the movement of the 3D icon to the image screen 41, and to the operation of throwing the 3D icon into the image screen 41.

Specifically, in the embodiment, the viewer's operation of the movement of the 3D icon to the image screen 41 instructs the image display device 100 to carry out image control that the 3D icon flows into the image screen 41 from the image plane 30. This results in that the operation of the viewer H and the operation of the floating image P2 are linked to each other without a feeling of strangeness.

Next, when the 3D icon displayed as the floating image P2 disappears (the 3D icon is shifted from the image plane 30 to the image screen 41), the image controller 110 of the image display device 100 carries out image control so as to expand, on the image screen 41, information associated with the 3D icon (step S40). Specifically, a function assigned to the 3D icon is further carried out to be applied to the direct view image P3 actually displayed on the display unit 40, and the direct view image P3 on which a result of the execution is reflected is displayed on the display unit 40.

This image control allows the viewer H to get a feeling as if the 3D icon presented as the floating image P2 is shifted to the display screen 41 and, on the image screen 41, executes a desired process to display a result of the desired process. That is, the linking effect can give the viewer H a feeling as if the function of the 3D icon is executed across the floating image screen and the direct view image screen that have a difference in position in the depth direction.

The linking representations of the image display device 100 according to the embodiment are nonconventional representations, and enhance the interlocking between the direct view image and the floating image to thereby improve the effects of the representations. In addition, linking the direct view image and the floating image implements intuitive and easy operations and information-displays for users.

Note that, in the flowchart illustrated in FIG. 9, after the completion of the shift of the symbol image in step S30, information associated with the symbol image is expanded on the direct view image in step S40, but the order of control of images is not limited thereto. The steps S30 and S40 can be simultaneously carried out.

Specifically, while the symbol image is changed, information associated with the symbol image can be expanded on the direct view image. While the 3D icon presented as the floating image P2 is moved, a function associated with the 3D icon can be carried out.

In the embodiment, the image screen 51 of the display unit 50 is placed in a direction in which functions of the displayed 3D icon are not carried out, more specifically, at the right of the floating image P2, but image screens for displaying direct view images need not be placed at the right of the floating image P2. Specifically, movement of the 3D icon in the direction in which no image screens are arranged so as to hide the 3D icon can express that the functions are not carried out. When an image screen for displaying direct view images is placed in a direction in which functions of the displayed 3D icon are not carried out, an object indicative of non-executing functions described later, such as "recycle bin", can be displayed on the image screen.

Next, linking representations of the image display device 100 according to the embodiment will be specifically described.

First Representation Embodiment

FIGS. 10 and 11 describe the first representation embodiment of the linking representations of the image display device 100. FIGS. 10 and 11 are views schematically illustrating the first representation embodiment of the linking representations. In the first representation embodiment, the image display device 100 has functions of a car navigation function to be integrated in movable objects, such as motor vehicles. Note that the first representation embodiment assumes that: the running position of a movable object is displayed as a map image, and a menu image of a search target is displayed on the display unit 60. Thus, a search is performed around the current location of the movable object.

First, when the image display device 100 displays a menu list on the display unit 60 (see (a) of FIG. 10), the viewer (driver) H touches a desired menu in a menu list displayed on the display unit 60 with viewer's finger F (see (b) of FIG. 10). Specifically, the image display device 100 displays, on the display unit 60, a menu by which shops and facilities, such as convenience stores, gasoline stations, and parking places, can be searched. At that time, the viewer H touches a menu of "gasoline station" in the menu list to thereby select the menu of "gasoline station". This allows the menu "gasoline station" in the menu list to be changed in color. Thus, the viewer H can recognize the menu selected thereby.

When grasping the selected menu of "gasoline station" from the position touched by a viewer's finger F (specifically, when the touch sensor of the position detector 120 detects the touched position of a finger F, and the image controller 110 determines the selected menu according to the detected position), the image display device 100 displays, as the floating image P2, a 3D icon indicative of "gasoline pump" that is an image corresponding to the menu "gasoline station" (see (c) of FIG. 10 corresponding to step S10 in FIG. 9). This allows the viewer H to recognize, from the floating image P2, that the viewer H selects the menu "gasoline station" as a search target so as to try to search for the location of gasoline stations.

Next, the viewer H moves his or her finger F around the 3D icon indicative of "gasoline pump" (see (a) of FIG. 11), and moves the finger F as if the 3D icon of "gasoline pump" is shifted to the image screen 41 of the display unit 40 (moves the finger F to the left) (see (b) of FIG. 11 corresponding to step S15 in FIG. 9).

When determining execution of the menu (search for gasoline stands) from the movement of the finger F of the viewer H (specifically, when the space sensor of the position detector 120 detects the position and motion of the finger F, and the image controller 110 determines the execution of the menu according to the detected position and motion of the finger F), the image display device 100 changes the floating image P2 so as to move the 3D icon of "gasoline pump" to the left with the 3D icon being gradually reduced in size (see (b) of FIG. 11 corresponding to steps S20 and S30 in FIG. 9). These results allow the 3D icon of "gasoline pump" to disappear.

As described above, the viewer's operation of throwing the 3D icon of "gasoline pump" into the image screen 41 of the display unit 40 allows the image display device 100 to carry out an image expression of throwing the 3D icon into the image screen 41.

Next, the image display device 100 searches map information around the current location for the locations of gasoline stations, and displays icon images P3a to P3e each indicative of "gasoline pump" at the gasoline station presented locations on the map displayed on the display unit 40 (see (c) of FIG. 11 corresponding to step S40 in FIG. 9). Specifically, the 3D icon "gasoline pump" is displayed as if it is divided to fall into the display unit 40 and the icons P3a to P3e of "gasoline pump" are displayed on the map.

Specifically, after the image expression of throwing the 3D icon of "gasoline pump" into the image screen 41, the image display device 100 carries out the image expression that the thrown icon of "gasoline pump" in the image screen 41 is distributed. This allows the viewer H to view the visual representation that the floating image P2 and the direct view image P3 are smoothly linked to each other.

As described above, in the first representation embodiment, the visual representation that the floating image P2 and the direct view image P3 are linked to each other allows users to carry out the search around the current location of the car navigation system by more realistic images.

Second Representation Embodiment

FIG. 12 describes the second representation embodiment of the linking representations of the image display device 100. FIG. 12 is a view schematically illustrating the second representation embodiment of the linking representations. In the second representation embodiment, the image display device 100 has functions of a car navigation function to be integrated in movable objects, such as motor vehicles. Note that the second representation embodiment assumes that: the running position of a movable object is displayed on the display unit 40 as a map image, and information indicative of traffic jam is provided.

First, when a communication device of the movable object receives the information indicative of traffic congestion, the image display device 100 displays, as the floating image P2, a 3D icon indicative of "occurrence of traffic jam" as a popup and displays a warning message on the display unit 60 (see (a) of FIG. 12 corresponding to step S10 in FIG. 9). Note that, referring to FIG. 12, the icon image indicative of "occurrence of traffic jam" is for example an image illustrating a plurality of motor vehicles are continued in the direction of movement. When viewing the 3D icon of "occurrence of traffic jam" and the warning message, the viewer (driver) H can grasp that there are traffic jams in the direction of movement of the movable object.

Next, the viewer H selects whether to require the information of indicative of traffic jam.

Specifically, when requiring the traffic-jam information, the viewer H moves his or her finger F close to the 3D icon, and moves the finger F as if the 3D icon is shifted to the image screen 41 of the display unit 40 (moves the finger F to the left) (see (b) of FIG. 12 corresponding to step S20 in FIG. 20).

Otherwise, when the viewer H does not require the traffic jam information, the viewer H moves his or her finger F close to the 3D icon, and moves the finger F as if the 3D icon is shifted to the image screen 51 of the display unit 50 (moves the finger F to the right) (see (b) of FIG. 12).

When the viewer H moves his or her finger F at the left, that is, it is determined that the viewer H requires the traffic jam information according to the movement of the finger F (specifically, when the space sensor of the position detector 120 detects the position and motion of the finger F, and the image controller 110 determines the execution of displaying the traffic-jam information), the image display device 100 carries out traffic-jam information service. Specifically, the image display device 100 moves the floating image P2 such that the 3D icon to the left while the 3D icon is gradually reduced in size (corresponding to steps S20 and S30 in FIG. 9). These results allow the 3D icon of "occurrence of traffic jam" to disappear.

As described above, the viewer's operation of throwing the 3D icon of "occurrence of traffic jam" into the image screen 41 of the display unit 40 allows the image display device 100 to carry out an image expression of throwing the 3D icon into the image screen 41.

Next, the image display device 100 obtains, from the received traffic jam information and map information, map information at the bottleneck of the traffic-jam, and displays the map information at the traffic bottleneck on the map displayed on the display unit 40 (see (c) of FIG. 12 corresponding to step S40 in FIG. 9). Specifically, the image display device 100 scrolls the map image displayed on the display unit 40 up to the traffic bottleneck, displays a map image around the traffic bottleneck, and highlights the traffic bottleneck P3f in predetermined color (see (c) of FIG. 12 corresponding to step S40 in FIG. 9).

Specifically, after the image expression of throwing the 3D icon of "occurrence of traffic jam" into the image screen 41, the image display device 100 carries out a process of the thrown icon of "occurrence of traffic jam" to thereby carry out the image expression to highlight the traffic bottleneck. This allows the viewer H to view the visual representation that the floating image P2 and the direct view image P3 are smoothly linked to each other.

On the other hand, when the viewer H moves his or her finger F at the right, that is, it is determined that the viewer H does not require the traffic-jam information according to the movement of the finger F (specifically, when the space sensor of the position detector 120 detects the position and motion of the finger F, and the image controller 110 determines that the display of the traffic jam information is not executed), the image display device 100 moves the 3D icon of "occurrence of traffic jam" displayed as the floating image P2 to the right with its size being gradually reduced. These results allow the 3D icon of "occurrence of traffic jam" to disappear.

As described above, the viewer's operation of throwing the 3D icon of "occurrence of traffic jam" into the image screen 51 of the display unit 50 allows the image display device 100 to carry out an image expression of throwing the 3D icon into the image screen 51.

Next, the image display device 100 carries out an image expression that the icon of "occurrence of traffic jam" enters into an icon of "recycle bin" so that the icon of "recycle bin" is expanded.

Specifically, after the image expression of throwing the 3D icon of "occurrence of traffic jam" into the image screen 51, the image display device 100 carries out the image expression that the icon of "occurrence of traffic jam" enters into an icon of "recycle bin" so that the icon of "recycle bin" is expanded. This allows the viewer H to view the visual representation that the floating image P2 and the direct view image P3 are smoothly linked to each other.

As described above, in the second representation embodiment, the visual representation that the floating image P2 and the direct view image P3 are linked to each other provides users traffic jam-information by more realistic images.

Third Representation Embodiment

Figure 14:
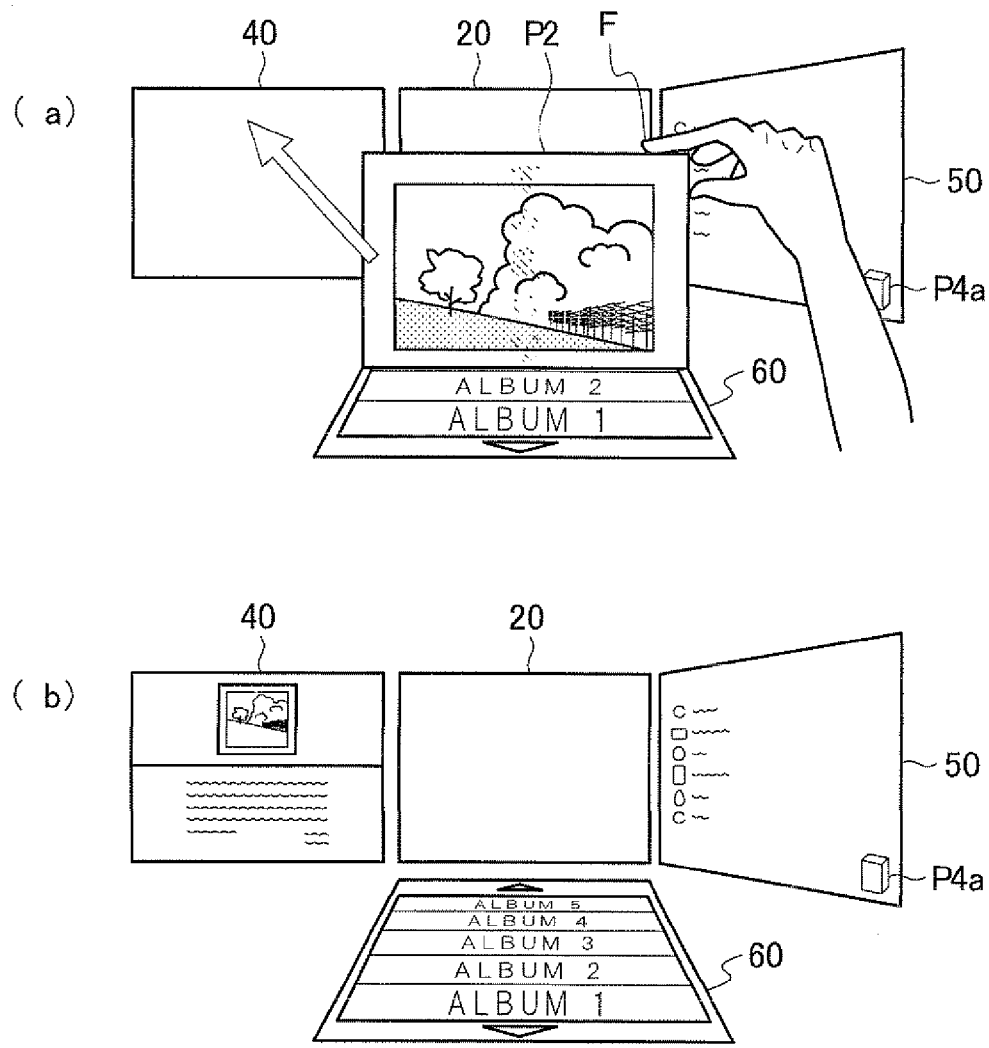
FIG. 14 is a view illustrating, in cooperation with FIG. 13, the examples of the images in the third representation embodiment of the linking representations by the image display device according to the embodiment of the present invention.

FIGS. 13 and 14 describe the third representation embodiment of the linking representations of the image display device 100. FIGS. 13 and 14 are views schematically illustrating the third representation embodiment of the linking representations. In the third representation embodiment, the image display device 100 has functions of a music playback system. Note that the third representation embodiment assumes that: a title menu of albums, such as CD and records, and music of a selected album by a viewer (an audience) is played.

First, when the image display device 100 displays the title menu on the image screen 61 of the display unit 60 (see (a) of FIG. 13), the viewer H operates a scroll bar to thereby search, while scrolling the title menu, for an album to be played in the title menu (see (b) of FIG. 13). When finding an album to be played, the viewer H touches the title of the album to be played with a finger F (see (c) of FIG. 13); this title of the album to be played is displayed on the image screen 61.

When grasping the selected album from the position touched by a viewer's finger F (specifically, when the touch sensor of the position detector 120 detects the touched position of a finger F, and the image controller 110 determines the selected album according to the detected position), the image display device 100 changes in color the title area of the selected album (see (c) of FIG. 13). For this reason, the viewer H can recognize the title of the selected album.

Next, when the viewer H lifts fingers F touched to the image screen 61, the image display device 100 detects the motion of the finger (motion of the fingers upward away from the image screen 61 after the touch of the fingers F on the image screen 61 and selection of an album). For this reason, the image display device 100 displays a "jacket image" of the selected album as the floating image P2 according to the motion of the fingers F (see (a) of FIG. 14 corresponding to step S10 in FIG. 9). This means that the position detector 120 (space sensor) detects the location of the fingers F, and image control is carried out so that the "jacket image" is displayed as the floating image P2 in agreement with the height of the fingers F. For this reason, as the fingers F is gradually moved upward from the image screen 61, the height of the "jacket image" is gradually increased so that the floating image P2 is displayed up to the height position of the fingers F. This allows the viewer H to get a feeling as if the viewer H lifts the record album selected thereby.

Next, the viewer H carries out an operation as if the lifted "jacket image" is shifted to the image screen 41 of the display unit 40 (moves the finger F to the left) (see (a) of FIG. 14 corresponding to step S15 in FIG. 9).

When grasping the playback of the selected album from the motion of the viewer's fingers F (specifically, when the space sensor of the position detector 120 detects the position and motion of the fingers F, and the image controller 110 determines the playback of the selected album), the image display device 100 changes the floating image P2 so as to move the "jacket image" to the left with its size being gradually reduced (corresponding to steps S20 and S30 in FIG. 9). These results allow the "jacket image" displayed as the floating image P2 to finally disappear.

As described above, the viewer's operation of throwing the "jacket image" into the image screen 41 of the display unit 40 allows the image display device 100 to carry out an image expression of throwing the "jacket image" into the image screen 41.

Next, the image display device 100 displays, on the image screen 41 of the display unit 40, attribute information, such as the jacket image, the program list, information of the lyrics, and so on, and plays the music of the selected album (see (b) of FIG. 14 corresponding to step S40 in FIG. 9).

Specifically, after the image expression of throwing the "jacket image" into the image screen 41, the image display device 100 plays the music of the selected album while carrying out the image expression of displaying the attribute information of the album corresponding to the thrown "jacket image". This allows the viewer H to view the visual representation that the floating image P2 and the direct view image P3 are smoothly linked to each other and to listen to music associated with the floating image P2.

As described above, in the third representation embodiment, in addition to the visual representation effects, the auditory representation effects are achieved. Specifically, this means that, in step S40 of FIG. 9, the expanded information includes music and voice contents.

On the other hand, when the viewer H executes a motion that the lifted jacket image is shifted to the image screen 51 of the display unit 50 (executes his or her finger to the right), as well as the second representation embodiment, the image display device 100 moves the "jacket image" displayed as the floating image P2 to the right with its size being gradually reduced. These results allow the "jacket image" to disappear.

Next, the image display device 100 carries out an image expression that the icon of "jacket image" enters into an icon of "recycle bin" so that the icon of "recycle bin" is expanded.

Specifically, after the image expression of throwing the 3D icon of "jacket image" into the image screen 51, the image display device 100 carries out the image expression that the icon of "jacket image" enters into the icon of "recycle bin" so that the icon of "recycle bin" is expanded. This allows the viewer H to view the visual representation that the floating image P2 and the direct view image P3 are smoothly linked to each other.

In this case, the display of the attribute information and the playback of music of the album corresponding to the "jacket image" displayed as the floating image P2 are not carried out so that a viewer's next selection of an album is waited.

In addition, in place of shifting the "jacket image" to the right to enter it into the recycle bin, when the viewer loses his or her fingers F off the "jacket image" (for example, draws his or her fingers from the space or expands his or her fingers that picks up the "jacket image", the lifted-up "jacket image" falls downward so as to be returned into the list (moves to the image screen 61 of the display device 60). In this case, the display of the attribute information and the playback of music of the album corresponding to the "jacket image" displayed as the floating image P2 are not carried out so that a viewer's next selection of an album is waited.

As described above, in the third representation embodiment, the visual representation that the floating image P2 and the direct view image P3 are linked to each other allows users to play music by more realistic images.

Note that, in the embodiment, as the structure of the image display device 100, a system that displays real images on the image plane 30, in other words, displays floating images on one plane (3D Floating Vision®) is adopted, but the structure of the floating image display unit 1 is not limited to the system. Specifically, any system capable of displaying real images in a space can be used. For example, an IP system (Integral Photography system) that displays real images as floating images can be adopted.

Figure 15:
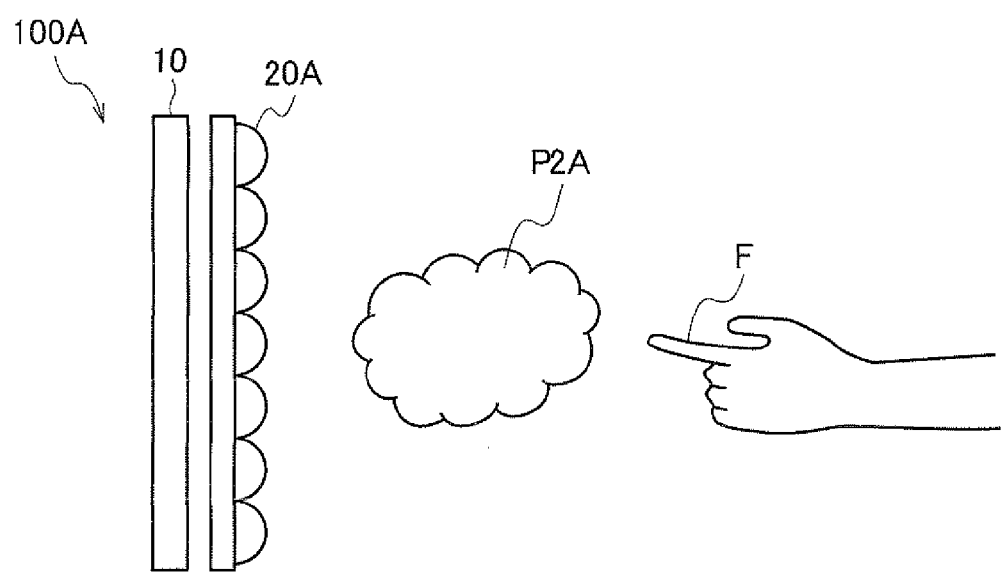
FIG. 15 is a view illustrating another structure of the floating image display unit of the image display device according to the embodiment of the present invention.

FIG. 15 is an outline structural view of an image display device 100A that adopts the IP system. In the IP system, as illustrated in FIG. 15, an image transfer panel 20A is placed closer to the display unit 10 in comparison to the 3D floating vision system. Specifically, the image display device 100A is, for example, a pinhole array, a microlens array, a lenticular lens, or the like. The image transfer panel 20A is used not to focus images on one plane but to change or control the direction of light left from the display unit 10. For this reason, the floating image P2 is formed as a floating image P2A with a depth.

Specifically, floating images according to the embodiment include two-dimensional images P2 displayed on a preset plane in a space, and three-dimensional images P2A displayed to have a physical depth in the space.

For example, in the third representation embodiment, the jacket image is not displayed as the floating image P2 on a fixed plane, but can be variably displayed in the depth direction (X direction in FIG. 6). For this reason, it is possible to display, according to the location of the selected album (in alignment with the touched position on the image screen 61), the floating image P2 on one plane formed above the touched position. This allows the viewer H to get a feeling as if the viewer H lifts the viewer's selected album.

Note that, in the IP system in the image display device 100A, because floating images P2A each with a depth are displayed, image control for two-dimensional images displayed on the display unit 10 is more complicated in comparison to the 3D Floating Vision® system in the image display device 100. For this reason, in view of easily producing stereoscopic images, the 3D floating vision system in the image display device 100 is more suitable.

As described above, the image display device 100 according to the embodiment comprises: the display unit 10 having the image screen 11 for displaying a two-dimensional image; the image transfer panel 20 located on a path of light left from the image screen 11; a floating image display unit 1 that displays, as a floating image, the light left from the image screen in a space, the space being located on one side of the image transfer panel 20 opposite to the other side thereof facing the display unit 10; the direct-view image display unit 2 provided with the display unit 40 having the image screen 41 for displaying a two-dimensional image, the direct-view image display unit displaying the two-dimensional image displayed on the image screen 41 as a direct view image; and an image controller that controls the floating image and the direct view image so as to be linked to each other.

The image controller carries out:

floating-image control that displays a given object as the floating image, and displays the floating image such that the given object displayed as the floating image is shifted in a specified direction from a displayed position of the floating image to the image screen 41; and direct-view image control that executes a process associated with the given object during or after the shift of the given object, and displays, on the image screen 41, a two-dimensional image on which the executed process is reflected.

For this reason, it is possible to:

enhance the link between the floating image and the direct view image to thereby improve the effects of the representations; and carry out easy and intuitive displays of information for users.

The embodiment and examples of the present invention have been described, but they can be subjected to various modifications and deformations within the scope of the present invention.

The invention claimed is:

1. An image display device comprising:
   a first display unit having a first image screen for displaying a two-dimensional image;
   an image transfer panel located on a path of light left from the first image screen;
   a floating image display means that displays, as a floating image, the light left from the first image screen in a space, the space being located on one side of the image transfer panel opposite to the other side thereof facing the first display unit;
   a direct-view image display means provided with a second display unit having a second image screen for displaying a two-dimensional image, the direct-view image display means displaying the two-dimensional image displayed on the second image screen as a direct view image;
   a third display unit configured to display a menu image on which information indicative of a target processing is included; and
   an image controller that controls the floating image and the direct view image so as to be linked to each other,
   wherein the image controller comprises:
   a floating-image control means that displays a given object corresponding to the processing target as the floating image when the information indicative of the target processing is specified on the menu image by a viewer, and displays the floating image such that the given object displayed as the floating image is shifted in a specified first direction from a displayed position of the floating image to the second image screen; and
   a direct-view image control means that executes the target processing specified by the viewer during or after the shift of the given object, and displays, on the second image screen, a two-dimensional image on which a result of execution of the target processing is displayed,
   the second image screen is placed at a back of the displayed position of the floating image as being viewed from a view position at which the floating image is viewable, and the image controller is adapted not to carry out the target processing specified by the viewer when the given object is shifted in a second direction different from the specified first direction, further comprising:
   an alternative second image screen placed in the second direction, the alternative second image screen being different from the second image screen placed in the specified first direction,
   the image controller further comprising:
   a second floating image control means that displays the floating image such that the given object displayed as the floating image is shifted in the second direction from the displayed position of the floating image to the alternative second image screen; and
   a second direct-view image control means that displays, on the alternative second image screen, a two-dimensional image indicative of non-execution of the target processing specified by the viewer.

2. The image display device according to claim 1, further comprising:
   a position detecting means that detects an object to be detected as at least part of a viewer in a space close to the floating image,
   wherein the image controller is adapted:
   to carry out the floating-image control means and the direct-view image control means when movement of the detected object detected by the position detecting means is in the first direction; and
   when the movement of the detected object detected by the position detecting means is in the second direction, not to carry out the process associated with the given object or to carry out the second floating image control means and the second direct-view image control means.

3. The image display device according to claim 1, wherein the process associated with the given object is to display an image content to be displayed on the second image screen and to play music and sound contents.

4. The image display device according to claim 1, wherein the floating image is a real image based on the two-dimensional image displayed on the first image screen.

5. The image display device according to claim 4, wherein the floating image is the real image focused by the image transfer panel on an image plane in the space.

6. The image display device according to claim 1, wherein the floating image controller is adapted to shift the given object displayed as the floating image from a first point to a second point with a size of the given object being gradually reduced so that the given object is finally lost, the given object being displayed firstly at the first point, the second point being closer to the second image screen than the first point.

7. A method of displaying an image, the method comprising:
   displaying a two-dimensional image on a first image screen of a first display unit;
   providing an image transfer panel located on a path of light left from the first image screen;
   displaying, as a floating image, the light left from the first image screen in a space, the space being located on one side of the image transfer panel opposite to the other side thereof facing the first display unit;
   displaying a two-dimensional image on the second image screen of a second display unit as a direct view image;
   displaying, using a third display unit, a menu image on which information indicative of a target processing is included;
   controlling the floating image and the direct view image so as to be linked to each other,
   displaying a given object corresponding to the processing target as the floating image when the information indicative of the target processing is specified on the menu image by a viewer, and displaying the floating image such that the given object displayed as the floating image is shifted in a specified first direction from a displayed position of the floating image to the second image screen;

executing the target processing specified by the viewer during or after the shift of the given object, and displaying, on the second image screen, a two-dimensional image on which a result of execution of the target processing is displayed;

placing the second image screen at a back of the displayed position of the floating image as being viewed from a view position at which the floating image is viewable, and not performing the target processing specified by the viewer when the given object is shifted in a second direction different from the specified first direction;

placing an alternative second image screen in the second direction, the alternative second image screen being different from the second image screen placed in the specified first direction;

displaying the floating image such that the given object displayed as the floating image is shifted in the second direction from the displayed position of the floating image to the alternative second image screen; and displaying, on the alternative second image screen, a two-dimensional image indicative of non-execution of the target processing specified by the viewer.

\* \* \* \* \*